(12) United States Patent
Matson (10) Patent No.: US 8,214,347 B2
(45) Date of Patent: Jul. 3, 2012

(54) SEARCH RESULT SUB-TOPIC IDENTIFICATION SYSTEM AND METHOD

(75) Inventor: Brett Charles Matson, Nicholls (AU)

(73) Assignee: Funnelback Pty Ltd., Dickson, Australian Capital Territory ( * ) Notice: Subject to any disclaimer, the term of this patent is extended or adjusted under 35 U.S.C. 154(b) by 277 days.

(21) Appl. No.: 12/525,439

(22) PCT Filed: Jan. 22, 2008

(86) PCT No.: PCT/AU2008/000072
§ 371 (c)(1),
(2), (4) Date: Jul. 31, 2009

(87) PCT Pub. No.: WO2008/098282
PCT Pub. Date: Aug. 21, 2008

(65) Prior Publication Data
US 2010/0005092 A1    Jan. 7, 2010

(30) Foreign Application Priority Data
Feb. 16, 2007 (AU) ................................ 2007900840

(51) Int. Cl.
*G06F 17/00* (2006.01)
(52) U.S. Cl. ........ 707/706; 707/707; 707/708; 707/712; 707/737
(58) Field of Classification Search .......... 707/706–708, 707/723, 735, 726
See application file for complete search history.

(56) References Cited

U.S. PATENT DOCUMENTS

| | | | |
|---|---|---|---|
| 6,546,399 B1 * | 4/2003 | Reed et al. | 1/1 |
| 6,944,612 B2 * | 9/2005 | Roustant et al. | 707/706 |
| 7,085,214 B2 * | 8/2006 | Shishido | 369/53.24 |
| 7,502,783 B2 * | 3/2009 | Palmon et al. | 1/1 |
| 7,693,827 B2 * | 4/2010 | Zamir et al. | 707/999.003 |
| 2006/0026152 A1 | 2/2006 | Zeng et al. | |

FOREIGN PATENT DOCUMENTS
WO    2007/011140 A1    1/2007

* cited by examiner

*Primary Examiner* — Sana Al Hashemi
(74) *Attorney, Agent, or Firm* — Barnes & Thornburg LLP (57) ABSTRACT

A method and apparatus for sub-topic identification from a search result that matches a query, said method including the steps of receiving a search result, extracting snippets from said search result that contain said query, truncating snippets on an instance of a boundary token, identifying phrases within said snippets that include the query, comparing all said phrases to determine optimal phrases, and presenting said optimal phrases. The apparatus for sub-topic identification from a search result that matches a query may include a dedicated server or a proxy for processing the search and sub-topic query.

22 Claims, 3 Drawing Sheets

SEARCH RESULT SUB-TOPIC IDENTIFICATION SYSTEM AND METHOD

CROSS-REFERENCE TO RELATED APPLICATIONS

This United States Non-Provisional Patent Application is a National Stage Entry that relies for priority on PCT Patent Application No. PCT/AU2008/000072, filed on Jan. 22, 2008, and also relies for priority on Australian Patent Application No. 2007900840, filed on Feb. 16, 2007, the contents of both of which are incorporated herein by reference.

FIELD OF THE INVENTION

The present invention relates to data searching and in particular to the analysis of data search results.

The invention has been developed primarily for use as a method of analysing and identifying sub-topics related to a search result and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Information retrieval is an established field of technology that often seeks to solve the problem of identifying the optimal set of documents, for example a search result, that solves an information need described by a query. Where identifying the optimal set of documents usually involves the steps of first determining the set of relevant documents and then ranking the identified documents by how likely they are to resolve the information requested by the query.

Related technologies, such as clustering, query expansion, sub-topic identification and hierarchical faceted navigation, are further utilised as supplemental tools which are typically aimed at enhancing the ability of users to identify specific information from within a defined closed set of documents.

These technologies are each limited in their ability to either define an optimal set of documents or to identify related information based on a provided search query.

SUMMARY OF THE INVENTION

It is an object of the invention in its preferred form to provide a faster and more effective way of identifying sub-topics related to a search query, and present the search result to the search user in a structure capable of intuitive navigation.

According to a first aspect of the invention there is provided a method of sub-topic identification from a search result that matches a query, said method including the steps of:
  (a) receiving a search result;
  (b) extracting snippets from said search result that contain said query;
  (c) truncating snippets on an instance of a boundary token;
  (d) identifying phrases within said snippets that include the query;
  (e) comparing all said phrases to determine optimal phrases; and
  (f) presenting said optimal phrases.

Preferably comparing all the phrases to determine optimal phrases includes comparing the frequency of all phrases for eliminating phrases with low frequencies. More preferably comparing all the phrases to determine optimal phrases includes eliminating phrases with five or more terms.

Preferably the method of sub-topic identification from a search result that matches a query, further includes any one or more of the steps selected from the set of steps including:
  (a) applying a stemming algorithm to the identifying phrases for reducing duplicate sub-topics that have the same meaning but different stem;
  (b) eliminating query terms from extracted phrases for enabling a broader set of phrases to be identified as substrings for the purpose of duplicate elimination; and
  (c) eliminating extracted phrases that contain one or more terms or expressions that are included in a predefined list of eliminator words and expressions.

More preferably the Porter Stemming Algorithm or a variant would be used as the stemming algorithm.

Preferably the search result includes one or more search result elements. More preferably these search result elements include references, or copies, of electronic documents or digital files that match the search query. Preferably the search result further includes additional information. More preferably the additional information is associated with one or more search result elements, including one or more selected from the set including a result title, metadata, one or more query-biased snippets, structured content or unstructured content.

Preferably, when truncating snippets on an instance of a boundary token, a boundary token includes one or more characters or expressions selected from a set such as ',' (comma), '.' (full stop), '|' (vertical bar), ' . . . ' (ellipsis), and '-' (hyphen with white space on both sides). This set may be predefined.

Preferably, identifying phrases within the snippets that include the query include scanning the snippets and identifying phrases ranging in length from two terms up to a pre-defined maximum number of terms that contain the query.

Preferably, comparing all the phrases to determine optimal phrases includes one or more steps selected from the set of steps including:
  (a) eliminating phrases that contain more than one instance of the query term;
  (b) eliminating phrases that contain nothing but the query term;
  (c) eliminating phrases that stem to nothing but the query term; and
  (d) eliminating phrases that start or end in a stop word.

Preferably, each phrase is then compared with all other phrases to determine all sets of two phrases that contain a common sub-phrase. More preferable when comparing between a first phrase and a second phrase, the comparison includes any one or more of the following:
  (a) skipping comparisons where the first phrase starts with the query term and the second phrase ends with the query term;
  (b) eliminating a first phrase that is a superstring of a second phrase if the first phrase has a lower frequency of occurrence than the second phrase; and
  (c) eliminating a first phrase that is a substring of a second phrase if the first phrase has the same frequency of occurrence as the second phrase.

Preferably, all remaining phrases that contain the maximum number of terms are eliminated. Eliminating the maximum number of terms is beneficial because in order to correctly determine which maximum size phrases do not form part of a larger phrase, it would be necessary to extract the larger phrases from the snippets and gather the associated phrase frequency information. More preferably, in the absence of this information, the chance of presenting meaningless partial sub-topics based on maximum length phrases is mitigated by eliminating the maximum length phrases.

Preferably the presenting of optimal phrases includes the steps of:
  (a) selecting a subset of the optimal phrases; and
  (b) presenting the subset of optimal phrases as sub-topics.

More preferably the selecting of a subset of optimal phrases further includes selecting a predefined number of optimal phrases, selected in order of greatest frequency of occurrence.

According to another aspect of the invention there is provided, a method of sub-topic identification from a search result and additional information that matches a query includes the steps of:
  (a) post processing said search result and said additional information to produce associated sub-topics; and
  (b) presenting the results such that they can be navigated by selecting said sub-topics.

Preferably, end-user content navigation by selection of the sub-topics includes the step of clicking a hyperlink that submits a Boolean AND, phrase or proximity type query containing the words that comprise the sub-topic.

According to another aspect of the invention there is provided, an apparatus for sub-topic identification comprises a computing device configured to perform a method of sub-topic identification as previously described.

According to another aspect of the invention there is provided, a sub-topic identification apparatus includes:
  a client module configured to receive a search query, said client module configured to output a search and sub-topic identification query, said client module further configured to display said results; and
  a processing module coupled to said client module, said processing module configured to input said search and sub-topic identification query; said processing module further configured to perform a method of sub-topic identification as previously described and produce said result.

Preferably the processing module is a dedicated sub-topic identification server. More preferably the client module is configured to send the search and sub-topic identification query to the dedicated sub-topic identification server over a transmission medium.

Most preferably the client module is further configured to send a search query to a server-side proxy that relays the search query and sub-topic identification query to separate servers to be processed in parallel. The outputs are then combined by the proxy into a single cohesive output and sent back to the client module in less time than is achievable in a single server configuration.

According to another aspect of the invention there is provided, a sub-topic identification apparatus including:
  a client module configured to receive a search query, said client module configured to output a search and sub-topic identification query, said client module further configured to receive a first part of said search result and display a search result; and
  a processing module coupled to said client module, said processing module configured to input said search and sub-topic identification query; said processing module further configured to perform a method of sub-topic identification according to any one of claims 1 to 19 and produce said search result and transmit said first part of said result to said client module.

Preferably, the processing module is a dedicated sub-topic identification server. More preferably, the client module is configured to send the search and said sub-topic identification query to the dedicated sub-topic identification server over a transmission medium.

The first part of the search result preferably includes all information associated with the search result or the first part of said search result includes said search result. Alternatively the client module further processes the first part of the search result to produce the search result.

According to another aspect of the invention there is provided, a sub-topic identification apparatus includes:
  a proxy search module configured to receive a search query, said proxy search module configured to output a search and sub-topic identification query, said proxy search module further configured to output a search result; said proxy search module further configured to receive a first part of said search result; said proxy search module further configured to output a search result; and
  a processing module coupled to said proxy search module, said processing module configured to input said sub-topic identification query; said processing module further configured to perform a method of sub-topic identification as previously described and produce said first part of said search result and transmit said first part of said search result to said proxy search module.

The first part of the search result preferably includes all information associated with the search result or the first part of said search result includes said search result. Alternatively the client module further processes the first part of the search result to produce the search result.

Preferably the proxy search module is coupled to a search module, wherein the proxy search module is configured to send the search query to the search module for processing the search and sub-topic identification query in parallel and wherein the proxy search module is configured to receive a second part of the search result from the search module; and the proxy search module is further configured to process the first and second part of the search result to produce said search result. Preferably the proxy module and the processing module are each dedicated systems.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Figure 1:
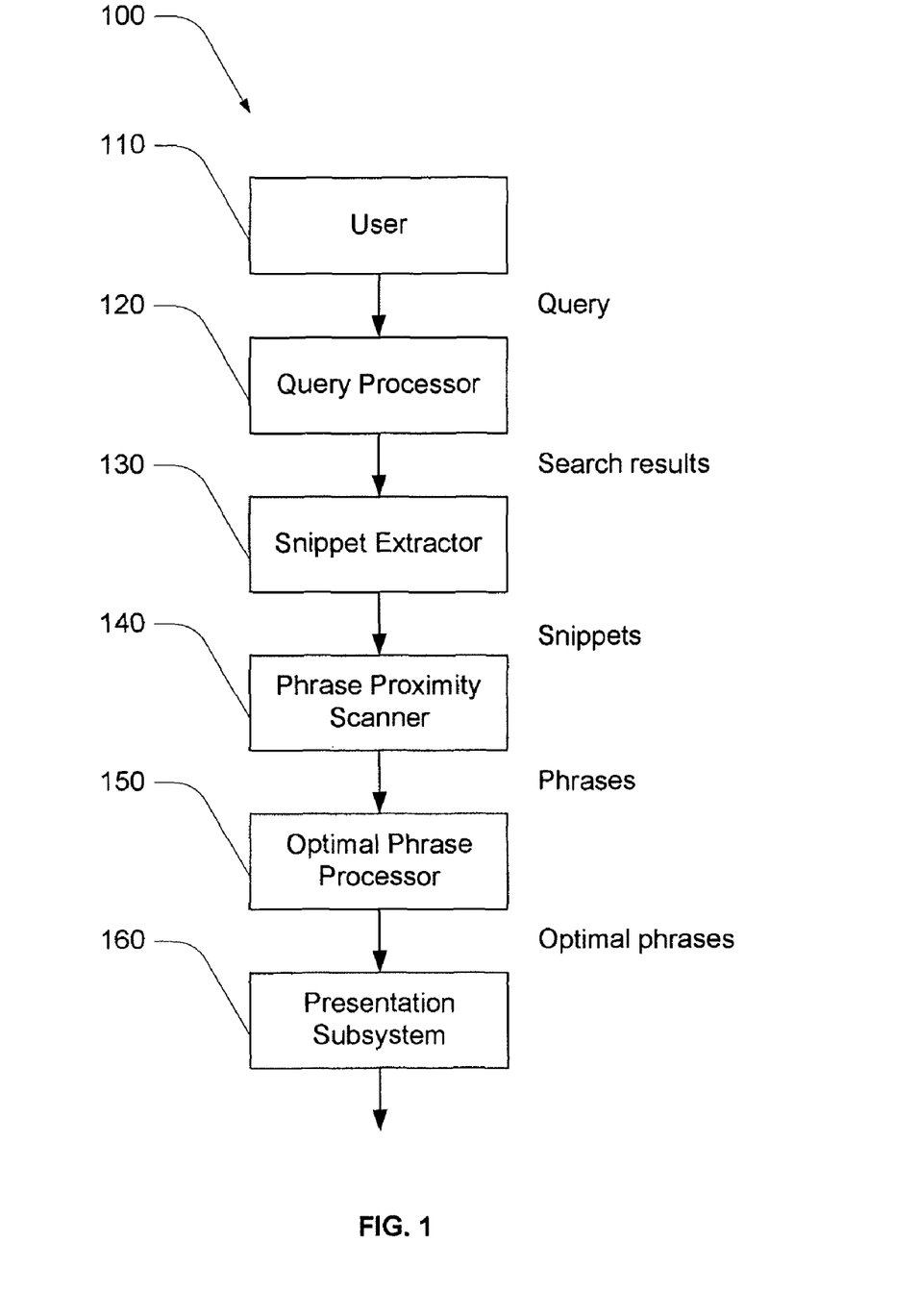
FIG. 1 shows a flow diagram including a method of sub-topic identification according to the invention.

Referring initially to FIG. 1 of the drawings, a flow diagram of an embodiment 100 is shown, that includes a method of sub-topic identification. In this embodiment a user 110 provides a query to the query processor 120. The query processor performs a search and outputs the search result to a snippet extractor 130. The search result includes one or more search result elements with associated additional information. The search result elements include links to, or copies of, documents identified by the query. The additional information includes result titles, metadata, query-biased snippets, structured content or unstructured content. Metadata is to be considered as any information associated with the search result or search result elements that are available, including descriptions, subject and HTML metadata used in describing the elements of the search result.

The snippet extractor 130 examines the search result elements and the additional information to output snippets containing the search query. The snippets are extracted from the search result elements and the additional information before being truncated on instances of a boundary token. The resulting snippets are then presented to the phrase proximity scanner 140.

The phrase proximity scanner 140 processes the extracted snippets to identify and produce a set of all two to five term phrases based on proximity to the query within the identified snippets. Longer phrases could be extracted at the expense of increased processing.

These phrases are then presented to the optimal phrase processor 150. This optimal phrase processor further processes the selected phrases to determine an optimal set of phrases. Each phrase is then compared with all other phrases to determine all sets of two phrases that contain a common sub-phrase. When comparing between a first phrase and a second phrase, the comparison includes any one or more of the following steps:
 (a) comparing respective frequency of occurrence;
 (b) eliminating a first phrase that is a superstring of a second phrase if the first phrase has a lower frequency of occurrence than the second phrase;
 (c) eliminating a first phrase that is a substring of a second phrase if the first phrase has the same frequency of occurrence as the second phrase and the first phrase is shorter then the second phrase.

The Optimal Phrase Processor also eliminates particular phrases by further including the steps:
 (a) eliminating phrases that contain more than one instance of the query term;
 (b) eliminating phrases that contain nothing but the query term;
 (c) eliminating phrases that stem to nothing but the query term;
 (d) eliminating phrases that start or end in a stop word; and
 (e) eliminating phrases that contain one or more terms that are included in a pre-define list of eliminator terms.

The optimal phrase processor further filters the remaining phrases by removing all phrases that contain five terms, or other pre-defined maximum number of terms as used by the phrase proximity scanner.

The optimal set of phrases is then provided to the presentation subsystem 160. This presentation subsystem presents the subset of optimal phrases as sub-topics associated with the original search result.

Further details, not shown, are described in the following paragraphs.

Phrases are also eliminated before comparing the combinations of two extracted phrases, when a phrase contains more than one instance of the query term, the phrase contains nothing but the query term, or the phrase stems to nothing but the query term. The motivation for this improvement is that practice has shown that phrases that exhibit any of these characteristics generally do not form useful sub-topics.

After the initial phrases have been extracted, a phrase that starts or ends in a stop word is removed from further processing. The motivation behind this improvement is that phrases that start or end with a stop word are often incomplete, non-sensical or have superfluous stop words. The associated stop word stripped sub-phrase is generally sufficiently meaningful to be presented to the user as a related sub-topic.

After the initial phrases have been extracted, any phrase that contains one or more terms or sub-phrases that appear in a pre-defined list of eliminator words and phrases are removed from further processing. The motivation behind this improvement is to provide the administrator with control over which sub-topics are suggested.

After the initial phrases have been extracted, phrases are stemmed using an algorithm such as the Porter Stemming Algorithm before further processing. The motivation behind this improvement is to eliminate duplicate sub-topics that have the same meaning but a different stem. Preferably, stemming should not be applied to the query term or terms present in the phrase because stemming can change the meaning of a term (e.g. hawk vs. hawking). Applying stemming to the non-query terms will broaden the nature and volume of the search results returned by navigating to the associated sub-topic while remaining relevant to the original query.

Prior to the sub-optimal phrase elimination, the query term or terms are removed from each extracted phrase. This allows phrases such as 'n korea' and 'north korea', where 'korea' is the query term, to be treated as sub-phrases so that the duplicate 'n korea' phrase is eliminated by the optimal phrase detector.

Example

An alternative embodiment of a method of sub-topic identification is shown by way of an example with reference to the sub-topic identification of a search result arising from the query 'classic'.

The search result and additional sources of information are received.

Snippets from the search result elements and additional sources of information that match the query are then extracted. The resulting snippets for this example at this stage are as follows:
 1. Listen to Mozart on ABC Classic FM. From Monday to . . .
 2. For all your music needs, ABC Classic FM is the . . .
 3. Featuring this week on ABC Classic FM is Germany's . . .
 4 . . . . guest host on Landline. If you're into Classic literature . . .
 5. Classic literature is becoming more popular . . .

The snippets are truncated on an instance of a boundary token. The resulting snippets for this example at this stage are as follows:
 1. Listen to Mozart on ABC Classic FM.
 2. ABC Classic FM is the . . .
 3. Featuring this week on ABC Classic FM is Germany's . . .
 4. If you're into Classic literature . . .
 5. Classic literature is fast becoming more popular . . .

Identifying phrases included in both the query and the snippets. The snippets are examined to identify short phrases that contain the query. The matching phrases and their frequency are recorded. The resulting phrases, with frequency in brackets '( )', for this example at this stage are as follows:
 1. abc classic (3)
 2. on abc classic (2)
 3. mozart on abc classic (1)
 4. classic fm (3)

5. abc classic fm (3)
6. classic fm is (2)
7. on abc classic fm (2)
8. abc classic fm is (2)
9. classic fm is the (1)
10. week on abc classic fm (1)
11. classic fm is germany's (1)
12. into classic (1)
13. classic literature (2)
14. into classic literature (1)
15. you're into classic (1)
16. if you're into classic (1)
17. you're into classic literature (1)
18. classic literature is (1)
19. classic literature is fast (1)

Phrases that start or end in a stop word are now eliminated. The resulting phrases for this example at this stage are as follows:

1. abc classic (3)
2. mozart on abc classic (1)
3. classic fm (3)
4. abc classic fm (3)
5. week on abc classic fm (1)
6. classic fm is germany's (1)
7. classic literature (2)
8. you're into classic (1)
9. you're into classic literature (1)
10. classic literature is fast (1)

Comparing all the phrases to select optimal phrases. Sub-optimal phrases, based on phrase length and frequency of occurrence, are further eliminated. The resulting phrases for this example at this stage are as follows:

1. mozart on abc classic (1)
2. abc classic fm (3)
3. classic fm is germany's (1)
4. classic literature (2)

It is shown that in this example 'abc classic fm' eliminates 'abc classic' because the score is the same and longer phrases are preferred. It is further shown that in this example, phrase 'abc classic fm' eliminates 'mozart on abc classic fm' because it occurs more often.

Low scoring phrases are further eliminated. The resulting phrases for this example at this stage are as follows:

1. abc classic fm (3)
2. classic literature (2)

The resulting optimal phrases are then presented. The phrases 'abc classic fm' and 'classic literature' are presented to the user as sub-topics for optional query refinement.

Although only one specific example is provided, it will be appreciated by those skilled in the art that the invention may be embodied in many other forms. For example, in other embodiments, other methods, or combinations of methods, for eliminating phrases before presentation are included in the method of sub-topic identification from the search result matching a query as described above. Many proposed methods for eliminating phrases have been described earlier.

A method of sub-topic identification from a search result and additional information that matches a query, includes the steps of post processing the search result and additional information to produce associated sub-topics; then presenting the results such that they can be navigated by selecting one or more sub-topics.

Apparatus

Figure 2:
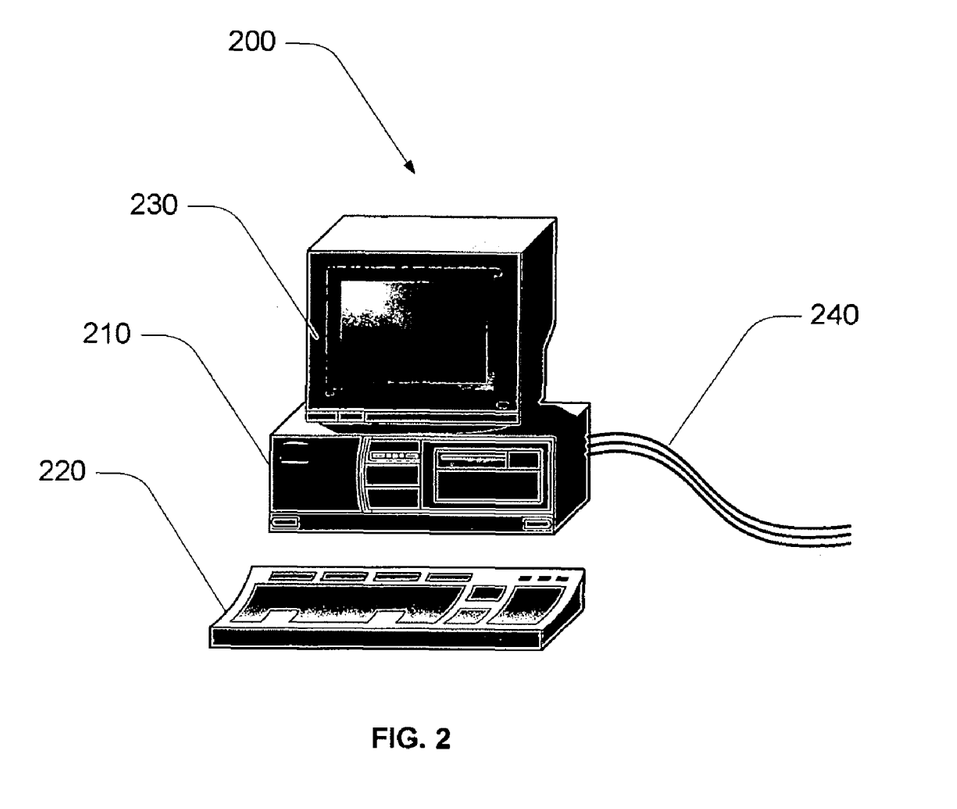
FIG. 2 shows an apparatus for performing a method of sub-topic identification according to the invention.

FIG. 2 shows an embodiment of apparatus for performing a method of sub-topic identification 200. The apparatus for performing a method of sub-topic identification 200 comprises a processing system 210, keyboard as an input device 220, a monitor as an output device 230 and a network connection 240 for transmitting and receiving data. Further, the input may be provided on a storage medium or via a computer network, input data may be pre-stored or entered at run time. The presentation of results may be displayed on a monitor, sent over a computer network or stored for later retrieval.

Preferably the processing system 210 is configured to perform a method of sub-topic identification from a search result that matches a query.

This is an embodiment of a computing device configured to perform a method of sub-topic identification as previously described and it will be appreciated by those skilled in the art that alternative combinations of input devices or output devices are suitable for implementing alternative embodiments.

Figure 3:
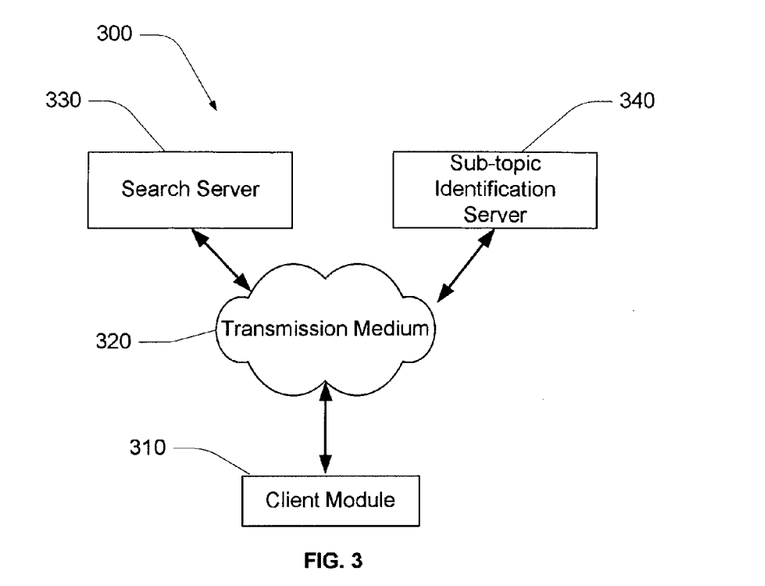
FIG. 3 shows system diagram representing another embodiment comprising a server architecture configured to perform a method of sub-topic identification according to the invention.

FIG. 3 shows a system diagram representing another embodiment comprising a server architecture configured to perform a method of sub-topic identification 300. The server architecture is configured to perform a method of sub-topic identification and comprises a client module 310, a transmission medium 320, a search server 330 and a sub-topic identification server 340.

The search server 330 is coupled to the client module via a transmission medium 320 and is configured to receive a search query, perform a search and transmit the first part of the search result. This first part of the search result may include all information associated with the search result or may includes the search result. Alternatively further processing the first part of the search result may be required to produce the output of the search result.

The sub-topic identification server 340 comprises a processing module coupled to the client module via a transmission medium 320. This processing module is configured to input a search and sub-topic identification query, perform a method of sub-topic identification as previously described, produce the first part of the sub-topic search result and transmit the first part of the sub-topic search result to the client module. The sub-topic identification server 340 is configured to respond to a search and sub-topic identification query by performing a method of sub-topic identification as previously described on a search result that matches a query.

In this embodiment dedicated servers implement the processing module and client module. In other embodiments, not shown, a single server may be configured to perform both modules or each module may be distributed across multiple servers.

The client module 310 is configured to transmit a search and sub-topic identification query to the search server 330 and sub-topic identification server 340, receive search result from the search server and the first part of the sub-topic result from the sub-topic identification server, and then present the search and sub-topic identification result.

In an alternative embodiment, not shown, the sub-topic identification server 340 will directly request search results from the search server 330.

The client module 310 is further configured to receive a search and sub-topic identification result and present the search result and sub-topic identification result using a browser interface. In an alternative embodiment, not shown, the client module presents the result to an alternative output, eg a storage device or a separate networked computer.

The transmission medium 320 is a computer network. In an alternative embodiment, not shown, the transmission medium is any form of electronic transmission including a carrier device.

Figure 4:
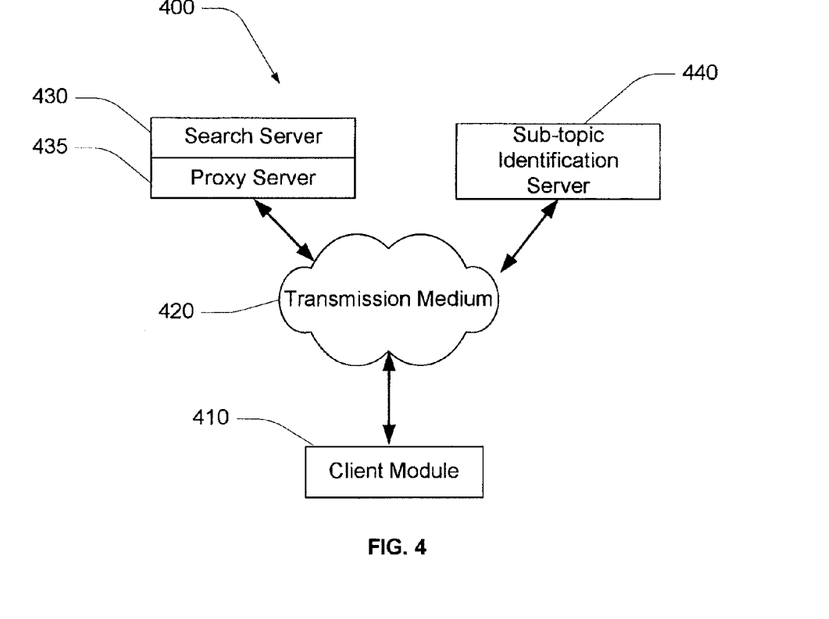
FIG. 4 shows system diagram representing another embodiment comprising a server architecture including a proxy module configured to perform a method of sub-topic identification according to the invention.

FIG. 4 shows a system diagram representing another embodiment comprising a server architecture including a proxy module configured to perform a method of sub-topic identification 400. The server architecture is configured to perform a method of sub-topic identification and comprises a client module 410, a transmission medium 420, a Proxy Server 435, a Search Server 430- and a Sub-topic Identification Server 440.

The Proxy Server 435 comprises a proxy search module to receive a search query directly from a client module. The proxy search module is further configured to output a search and sub-topic identification query, based on the initial search query, to the Sub-topic Identification Server 440. In an alternative embodiment, not shown, the proxy search module will also send a search query to the search server, receive the search result and forward the search result to the Sub-topic Identification Server.

The proxy search module is further configured to output a search result, where the first part of the search result is received from the Sub-topic Identification Server. This first part of the search result may include all information associated with the search result or may includes the search result. Alternatively further processing the first part of the search result may be required to produce the output of the search result.

The Sub-topic Identification Server 440 comprises a processing module coupled to the proxy search module via the transmission medium, and is configured to receive the search and sub-topic identification query. The processing module is further configured to perform a method of sub-topic identification as previously described, produce the first part of the search result and transmit the first part of the search result to the proxy search module.

The proxy server 435 is further configured to receive at first part of the search result from the Sub-topic Identification Server 440. The results are combined with any search results received from the Search Server 430 and these results are transmitted to the client module 410.

In this embodiment, dedicated servers implement the processing module the client module and the proxy search module. In other embodiments, not shown, a single server may be configured to comprise all modules or each module may be distributed across multiple servers.

The client module 410 is configured to transmit the search query to the proxy server 335, receive search result from the proxy server, and then present the search and sub-topic identification result.

The client module 440 is further configured to receive a search and sub-topic identification results and present the search result and sub-topic identification result using a browser interface. In an alternative embodiment, not shown, the client module may present the result to an alternative output, eg a storage device or a separate networked computer.

The transmission medium 420 is a computer network. In an alternative embodiment, not shown, the transmission medium is any form of electronic transmission including a carrier device.

In one embodiment, not shown, a search system that consists of a user interacting with a full text and metadata query processor, for example a sub-topic identification server, that is capable of outputting results in XML format. The output of the query processor is analysed by the Perl based phrase extractor, phrase proximity extractor and optimal phrase processor, before being output in HTML via the presentation sub-system. A person skilled in this area would understand that this is one embodiment and that the methodology could be applied to other information retrieval systems and in other languages.

To achieve the near real-time query response as expected by search engine users, the sub-topic identification processing could be carried out on a dedicated server. A dedicated server setup could comprise a client module that sends a search query to a server-side proxy that relays the search query and sub-topic identification query to separate servers to be processed in parallel. The outputs are then combined by the proxy into a single cohesive output and sent back to the client module in less time than is achievable in a single server configuration. Alternatively, or additionally, to prevent users from experiencing latency during query processing, the search result should be displayed as soon as they become available, not after the sub-topic identification has been completed.

It will be appreciated that, in referring to the above embodiments and example, a method and system is provided for identifying sub-topics related to a search query. Resulting sub-topics are presented to the search user as an optional query refinement interface that is supplementary to the main query input interface and enables a more intuitive navigation to the search result of any related sub-topic query. In this context, navigation involves clicking a hyperlink that submits a Boolean AND, phrase or proximity type query containing the words that comprise the sub-topic. The sub-topic identification is achieved by post-processing the search result snippets, titles, metadata and other available content to determine commonly occurring phrases, where a phrase may be an ordered sequence of two up to a pre-defined maximum number of words. These snippets may be descriptive about the topic of the documents they represent and the query.

Although the invention has been described with reference to specific examples, it will be appreciated by those skilled in the art that the invention may be embodied in many other forms.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while the diagrams only shows a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of whatever the device is, as appropriate. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Interpretation

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method of operating a computer system environment for the processing of search results which match a search query to provide for sub-topic identification of the search results, the method comprising:
   receiving a search result;
   extracting snippets from said search result that contain said query;
   truncating snippets on an instance of a boundary token;
   identifying phrases within said snippets that include the query;
   comparing all said phrases to determine optimal phrases; and
   presenting said optimal phrases;
   wherein said comparing all said phrases comprises comparisons between a first phrase and a second phrase, wherein said comparisons between combinations of two phrases comprises:
   skipping comparisons where said first phrase starts with the query term and said second phrase ends with the query term;
   eliminating a first phrase that is a superstring of said second phrase if said first phrase has a lower frequency of occurrence than said second phrase; and
   eliminating said first phrase that is a substring of said second phrase if said first phrase has the same frequency of occurrence as said second phrase.

2. A sub-topic identification apparatus comprising:
   a client module configured to receive a search query, said client module configured to output a search and sub-topic identification query, said client module further configured to receive a first part of said search result and display a search result; and
   a processing module coupled to said client module, said processing module configured to input said search and sub-topic identification query;
   said processing module further configured to perform a method of sub-topic identification according to claim 1 and produce said first part of said search result and transmit said first part of said result to said client module.

3. A method according to claim 1, wherein said search result comprises one or more search result elements.

4. A method according to claim 1, wherein said boundary token comprises one or more characters or expressions selected from a set comprising:
   ',' (comma);
   '.' (full stop);
   '|' (vertical bar);
   '. . .' (ellipsis); and
   '-' (hyphen with white space on both sides).

5. A method according to claim 1, wherein said identifying phrases within said snippets that include the query comprise scanning said snippets and identifying said phrases ranging in length from two terms up to a predefined maximum number of terms that contain said query.

6. A method according to claim 1, wherein said comparing of phrases comprises comparing frequency of occurrence for eliminating phrases with lower frequencies.

7. A method according to claim 1, wherein said comparing all said phrases comprises one or more steps selected from the set of steps comprising:
   eliminating phrases that contain more than one instance of the query term;
   eliminating phrases that contain nothing but the query term; and
   eliminating phrases that stem to nothing but the query term.

8. A method according to claim 1, wherein said comparing all said phrases further comprises: eliminating phrases that start or end in a stop word.

9. A method according to claim 1, wherein said comparing all said phrases comprises the eliminating from further processing all phrases that contain greater then a predefined number of terms.

10. A method according to claim 1, wherein said method further comprises: applying a stemming algorithm to the non-query terms present in said identifying phrases, for reducing duplicate sub-topics that have the same meaning but different stem.

11. A method according to claim 1, wherein said method further comprises: eliminating query terms from extracted phrases for enabling a broader set of phrases to be identified as substrings for the purpose of duplicate elimination.

12. A method according to claim 1, wherein said method comprises: eliminating extracted phrases that contain one or more terms or expressions that are included in a predefined list of eliminator words and expressions.

13. A method according to claim 1, wherein said presenting the optimal phrases comprises:
    selecting a subset of said optimal phrases; and
    presenting said subset of optimal phrases as sub-topics.

14. An apparatus according to claim 2, wherein said processing module is a dedicated sub-topic identification server.

15. A method according to claim 3, wherein said search result further comprises additional information, wherein said additional information is associated with one or more said search result elements.

16. A method according to claim 10, wherein said stemming algorithm comprises the Porter Stemming Algorithm.

17. A method according to claim 13, wherein said selecting a subset of said optimal phrases comprises selecting a predefined number of said optimal phrases, selected in order of greatest frequency of occurrence.

18. An apparatus according to claim 14, wherein said client module is configured to send said search and said sub-topic identification query to said dedicated sub-topic identification server over a transmission medium.

19. A method according to claim 15, wherein said additional information comprises one or more selected from a set comprising:
    a result title;
    metadata;
    a query-biased snippet;
    structured content; and
    unstructured content.

20. An apparatus according to claim 18, wherein said first part of said search result includes all information associated with said search result.

21. An apparatus according to claim 18, wherein said first part of said search result includes said search result.

22. An apparatus according to claim 18, wherein said client module further processes said first part of said search result to produce said search result.

* * * * *